(12) United States Patent
Luukkala et al.

(10) Patent No.: US 8,812,688 B2
(45) Date of Patent: Aug. 19, 2014

(54) METHOD AND APPARATUS FOR PROVIDING SHARED CONNECTIVITY

(75) Inventors: Vesa-Veikko Luukkala, Espoo (FI); Gerard Bosch Creus, Helsinki (FI); Sergey Boldyrev, Soderkulla (FI); Pauline Githinji, Nairobi (KE); Jussi Markus Impio, Nairobi (KE)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 13/247,875

(22) Filed: Sep. 28, 2011

(65) Prior Publication Data

US 2012/0079111 A1  Mar. 29, 2012

Related U.S. Application Data

(60) Provisional application No. 61/387,262, filed on Sep. 28, 2010.

(51) Int. Cl.
 *G06F 15/16* (2006.01)
(52) U.S. Cl.
 USPC .............. 709/227; 713/155; 713/168; 726/3; 380/277; 380/286
(58) Field of Classification Search
 USPC .............. 709/225, 227; 713/155, 168; 726/3; 380/277, 286
 See application file for complete search history.

(56) References Cited

U.S. PATENT DOCUMENTS

| | | | |
|---|---|---|---|
| 6,167,052 A * | 12/2000 | McNeill et al. | 370/399 |
| 6,256,637 B1 | 7/2001 | Venkatesh et al. | |
| 6,671,757 B1 | 12/2003 | Multer et al. | |
| 7,266,383 B2 * | 9/2007 | Anderson | 455/518 |
| 8,315,628 B2 * | 11/2012 | Thermond | 455/436 |
| 2004/0110462 A1 | 6/2004 | Forstadius | |
| 2006/0031316 A1 | 2/2006 | Forstadius | |
| 2006/0047800 A1 * | 3/2006 | Caveney et al. | 709/223 |
| 2006/0095515 A1 | 5/2006 | Forstadius | |
| 2006/0167997 A1 | 7/2006 | Forstadius | |
| 2009/0064007 A1 | 3/2009 | Lazier et al. | |
| 2010/0017468 A1 | 1/2010 | Forstadius | |
| 2010/0042994 A1 | 2/2010 | Vasilevsky et al. | |
| 2010/0318712 A1 | 12/2010 | Boldyrev et al. | |
| 2011/0083130 A1 | 4/2011 | Boldyrev et al. | |

FOREIGN PATENT DOCUMENTS

| | | |
|---|---|---|
| EP | 1180903 A1 | 2/2002 |
| EP | 1225778 A2 | 7/2002 |
| EP | 1372333 A2 | 12/2003 |
| EP | 1598736 A2 | 11/2005 |

OTHER PUBLICATIONS

TAT The Astonishing Tribe, "Official Demos and Concepts", http://www.tat.se/site/showroom/latest_design.html, retrieved from the Internet Sep. 28, 2011.

\* cited by examiner

*Primary Examiner* — Jason K. Gee
*Assistant Examiner* — Sharif E Ullah
(74) *Attorney, Agent, or Firm* — Ditthavong & Steiner, P.C.

(57) ABSTRACT

An approach is provided for providing shared path connectivity among devices. A connection sharing platform determines to specify at least one group of devices, the at least one group including at least a first path to establish a network connection and a second path to establish a local connection among the devices. The connection sharing platform also determines to cause at least in part an activation of one or more of the devices to establish the network connection, wherein one or more unactivated devices share the network connection over the local connection.

15 Claims, 13 Drawing Sheets

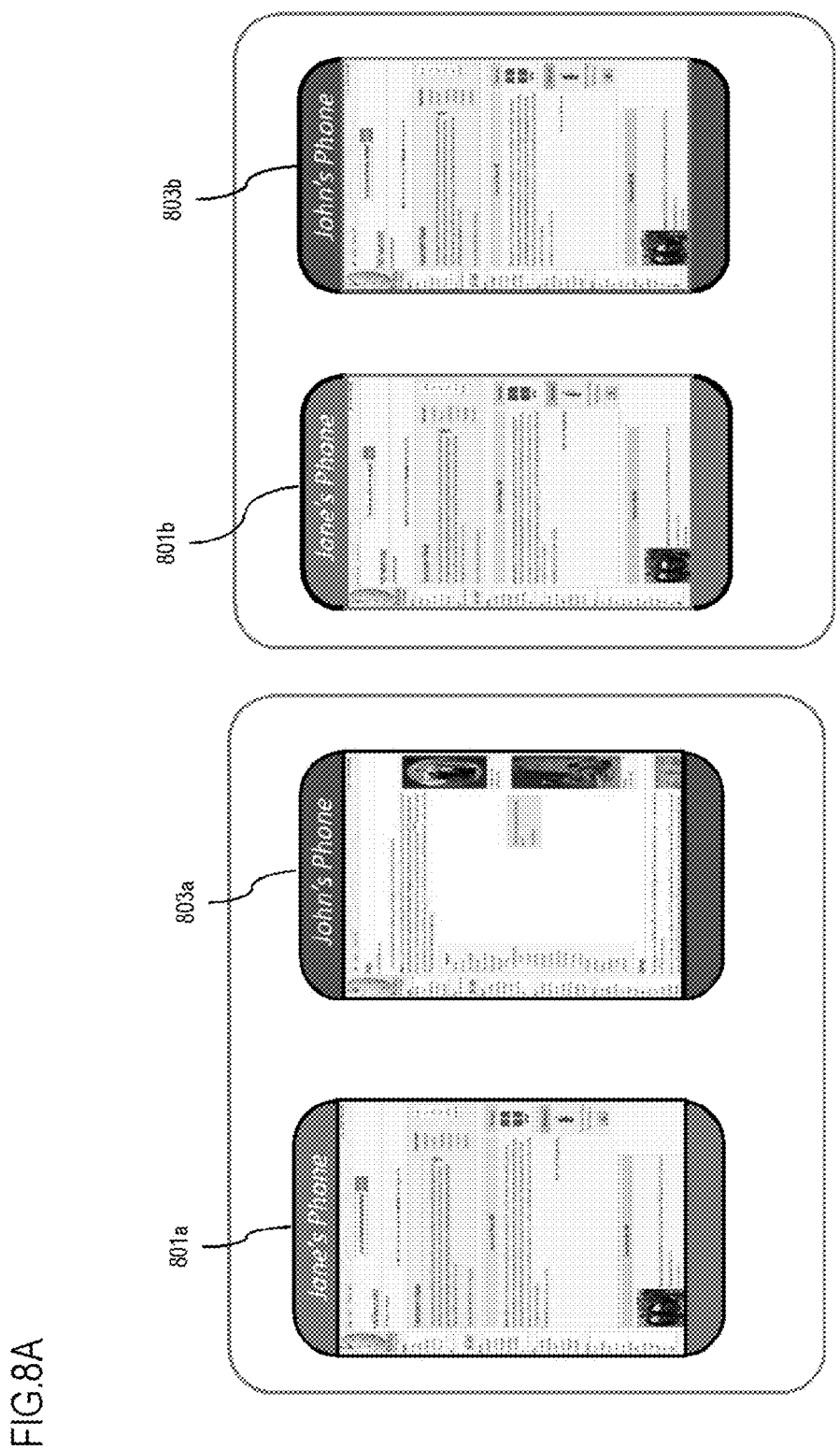

METHOD AND APPARATUS FOR PROVIDING SHARED CONNECTIVITY

RELATED APPLICATION

This application claims priority benefit to U.S. Provisional Patent Application No. 61/387,262, filed Sep. 28, 2010, which is herein incorporated by reference in its entirety.

BACKGROUND

Wireless (e.g., cellular) service providers, for example, continue to develop more enhanced network services and applications. Consequently, manufacturers of mobile devices (e.g., cellular phones) are challenged to continually add greater functional capabilities in smaller form factors. However, the goals of greater functionalities with reduced form factor are at odds with the design of the power system of the mobile devices, in that generally more functions require more battery consumption. By way of example, one of these functional capabilities includes ubiquitous access to data and/or internet connections over, for instance, cellular data connections. As a result, one of the primary drains on the energy resources (e.g., batteries) of a mobile device is for path (e.g. radio) access to data networks (e.g., via a cellular data modem). It is further noted that developments in the hardware capabilities of mobile devices have resulted with various methods of connectivity with different rates of power consumption (e.g., network connectivity via a cellular data modem that generally consume higher amounts of power for longer range transmissions, and local connectivity via short range wireless radios—e.g., Bluetooth®, WiFi, etc.).

At the same time, there has been development of distributed systems for managing information and related applications and/or processes. By way of example, such systems can be achieved through numerous, individual and personal information spaces in which persons, groups of persons, etc. can place, share, interact and manipulate webs of information and/or applications with their own locally agreed semantics without necessarily conforming to an unobtainable, global whole. These information spaces, often referred to as smart spaces, are extensions of the 'Giant Global Graph' in which one can apply semantics and reasoning at a local level. More specifically, information spaces are working spaces embedded within distributed infrastructures that can span multiple computers, information appliances, sensors, and the like. In some instances, computing processes (e.g., granular reflective processes) associated with the information spaces may also be distributed over the infrastructures.

Accordingly, service providers and device manufacturers face significant technical challenges to sharing or distributing processes related to establishing network connectivity over, for example, distributed systems such as information spaces. Such sharing can potentially reduce overall power consumption associated with providing data connectivity among the mobile devices participating in the sharing.

SOME EXAMPLE EMBODIMENTS

Therefore, there is a need for an approach for providing shared path connectivity among devices to reduce energy cost in distributed infrastructures.

According to one embodiment, a method comprises determining to specify at least one group of devices, the at least one group including at least a first path to establish a network connection and a second path to establish a local connection among the devices. The method also comprises determining to cause at least in part an activation of one or more of the devices to establish the network connection, wherein one or more unactivated devices share the network connection over the local connection.

According to another embodiment, an apparatus comprises at least one processor, and at least one memory including computer program code, the at least one memory and the computer program code configured to, with the at least one processor, cause, at least in part, the apparatus determine to specify at least one group of devices, the at least one group including at least a first path to establish a network connection and a second path to establish a local connection among the devices. The apparatus is also caused to determine cause at least in part activation of one or more of the devices to establish the network connection, wherein one or more unactivated devices share the network connection over the local connection.

According to another embodiment, a computer-readable storage medium carries one or more sequences of one or more instructions which, when executed by one or more processors, cause, at least in part, an apparatus to determine to specify at least one group of devices, the at least one group including at least a first path to establish a network connection and a second path to establish a local connection among the devices. The apparatus is also caused to determine cause at least in part activation of one or more of the devices to establish the network connection, wherein one or more unactivated devices share the network connection over the local connection.

According to another embodiment, an apparatus comprises means for determining to specify at least one group of devices, the at least one group including at least a first path to establish a network connection and a second path to establish a local connection among the devices. The apparatus also comprises means for determining to cause at least in part an activation of one or more of the devices to establish the network connection, wherein one or more unactivated devices share the network connection over the local connection.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8C are diagrams of user interface sharing, according to various embodiments;

DESCRIPTION OF SOME EMBODIMENTS

Examples of a method, apparatus, and computer program for providing shared path connectivity among devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to an aggregated information set from different sources. This multi-sourcing is very flexible since it accounts and relies on the observation that the same piece of information and/or related processes can come from different sources. For example, the same information and/or related processes (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Figure 1:
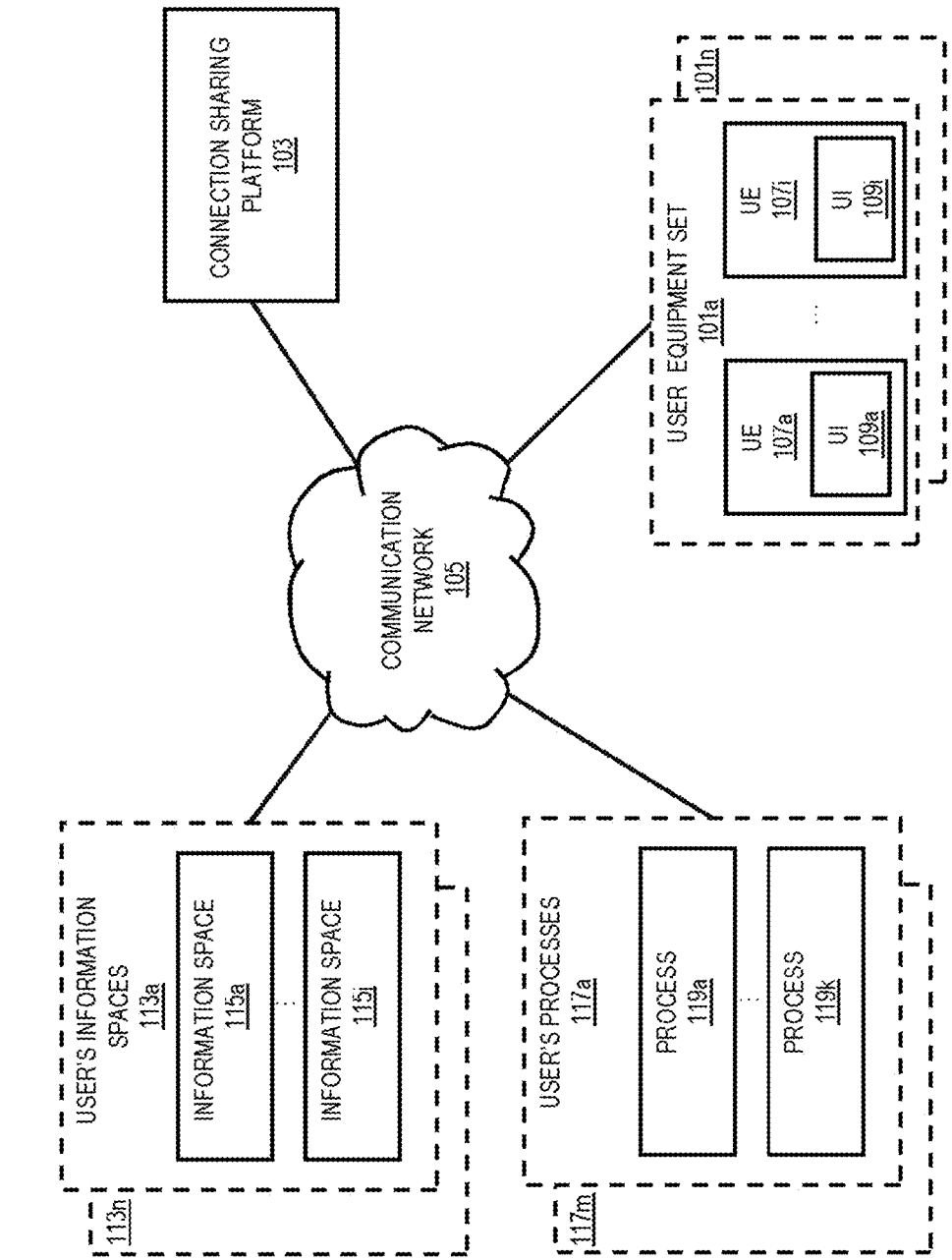
FIG. 1 is a diagram of a system capable of providing shared path connectivity among devices, according to one embodiment.

FIG. 1 is a diagram of a system capable of providing shared path connectivity among devices, according to one embodiment. As previously described, an information space consists of, for instance, several distributed devices that communicate information (e.g. RDF graphs) via a shared memory such as a Semantic Information Broker (SIB). In one embodiment, a device within an information space environment may store information locally in its own memory space or publish information to the semantic information broker. In the first case, the device is responsible for any process needed for combination or extraction of information, while in the second case the data manipulation processes can be conducted by the semantic information broker. By way of example, the information stored within an information space may be organized as lists or sets of information that can include many data elements (e.g., a contact list, inventory of goods, business directory, etc.).

The basic concept of information space technology includes providing access to distributed information for various devices within the scope of the information space. In certain embodiments, this access is provided in such a way that the distributed nature of the information is hidden from users. As a result, the information space appears to a user as if all the accessed information is stored on the same device. The information space also enables a user to have control over information distribution by transferring information between devices that the user has access to. For example, a user may want to transfer information among work devices, home devices, and portable devices. Current technologies enable a user of a mobile device to manipulate contexts such as data and information via the elements of one or more user interfaces of one or more user equipments.

Mobile devices operate using batteries with limited lifetime. Usually battery life is one of the main limiting factors for activities such as browsing the network. A typical browsing operational time for a mobile device can be as low as one or two hours assuming that no other activities are performed using the device. Considering activities such as phone calls and other background processing on the device the battery life rapidly drops. Since network browsing may not be a critical activity compared to receiving phone calls, users may avoid using various services in order to preserve the battery energy for more critical uses. This is especially pertinent when user is on the move and unable to access a charger. Furthermore, when the users are in an environment with other mobile users, they are actually competing for the connection resources. The more concurrent users exist in one location, the more path congestion and battery usage occurs.

To address this problem, a system 100 of FIG. 1 introduces the capability to provide shared path connectivity among devices to enable several mobile devices to use their energy efficiently by sharing their connection paths. In order to enable a user of an information space, who connects to the information space via one or more user devices, to distribute computations among the one or more user devices or other devices with access to the information space, each computation is deconstructed to its basic or primitive processes or computation closures. As used herein, computation closures refer to relations and communications among various computations including passing arguments, sharing process results, flow of data and process results, etc. Once a computation is divided into its primitive computation closures, the processes within or represented by each closure may be executed in a distributed fashion and the processing results can be collected and aggregated into the result of the execution of the initial overall computation.

In one exemplary embodiment, the mechanism of system 100 enables a group of users to share the path for radio connections of their devices in order to save battery life of individual participating devices. The sharing of radio connection paths can be done anonymously so that neither of the users is aware of others' presence. It is noted that, splitting the using time of radio resources across multiple devices yields a better energy efficiency compared to same amount of time used on a single radio resource. This is due to the fact that typically the radio interface consumes power proportionally to the time it is powered on, and not to the amount of data packets transmitted. Transitioning to energy-saving states typically takes several seconds which represent wasted energy if no transmission takes place. Therefore, with regards to energy consumption, it is more efficient for a single device to use local access radios, such as Bluetooth® or WLAN®, to connect to a designated device offering wide area radio connectivity, such as 3G® or Long Term Evolution (LTE®) technologies, provided that no single device uses the wide area radio for too long. The more participants in this scheme, the more efficient radio transmission becomes, since local access radios such as Bluetooth are at least an order of magnitude more efficient than wide area radios due to their much lower transmission power because of their reduced range.

As shown in FIG. 1, the system 100 comprises one or more user equipment sets 101a-101n consisting of user equipments (UEs) 107a-107i having connectivity to connection sharing platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, processes may be implicitly or explicitly distributed (migrated) between devices, information spaces, and other infrastructure. The process migration can be initiated for example by means of single-cast (e.g., to just another UE 107) or multi-cast (e.g., to multiple other UEs 107). Additionally, process migration may be triggered via gesture recognition, wherein the user preselects a particular set of UI elements and makes a gesture to simulate "pouring" the selected UE elements from one device to another.

In one embodiment, a UI element may be a region of the UI which is defined by the user as a free-shape contour using fingers or a pointing device. In another embodiment, gesture recognition may be used when user grabs a preselected set of UI elements or a predefined region of the UI and moves it from one device to another or from one logical representation to another.

As seen in FIG. 1, a user of UEs 107a-107i may own various pieces of information distributed over a set 113a of information spaces 115a-115j. The user can access the information via the set of equipment 101a consisting of UEs 107a-107i wherein each UE 107a-107i is equipped with one or more user interfaces (UI) 109a-109i. Furthermore, each UE 107a-107i may have access to a set 117a of processes 119a-119k that can be used to manipulate the information stored in information spaces 115a-115j and produce results requested by the user of the UE.

In one embodiment, an information management infrastructure (not shown) consists of information about binding between the elements of each UI 109a-109i, areas of rendered UIs 109a-109i and actual information processing through processes 119a-119k. The binding information enables a user of a UE 107a-107i to; for example, visually assign particular tasks to other UEs owned by the same user. For example, the user may select the tasks that need to be completed, by touching the UI elements related to those tasks on a UI of a first UE, pointing the UE towards other on-premises entities (other UEs in the vicinity of the first UE), distribute the actual computation for the selected tasks to other UEs by kicking out, brushing off or pouring the particular UI elements from the first UE to other UEs through figure gestures.

In one embodiment, binding between the elements or regions of UIs 109a-109i and the actual computations or functions performed by processes 119a-119k is done through computation closures defined and stored by the information management infrastructure. The computation closures provide the capability of slicing of computations for processes 119a-119k for a user and transmitting the computation slices between UEs 107a-107i, and information spaces 115a-115j.

The information management infrastructure may use seamless information processing techniques in order to enhance the computation closures. Seamless information management is the enabling technology for reflective process or context migration. In one embodiment, in addition to the migration of computations between devices, virtual execution environments such as M3® may be dynamically bound. The application of seamless information processing techniques may allow dynamically balanced load between concurrent execution environments taking into account the user's current context.

In one embodiment, computation closures may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://......./rule#CD-introduction, | rdf:type, | uri://............/Rule |
| uri://......./rule#CD-introduction, | uri://......./rule#assumption, | "c" |

In one embodiment, the connection sharing platform 103 facilitates anonymous connection between a group 101a-101n of participating user equipments 107a-107i within a limited locality. The connection sharing platform 103 which can be set up by a remote server via the communication network 105 may facilitate establishment of a network connection and a local connection via at least a first path and a second path. The connection sharing platform 103 may activate one or more UEs from the participating group of UEs (or a connectivity group) to establish the network connections over the communication network 105. Additionally, the communication sharing platform 103 may facilitate sharing of the network connection for the unactivated UEs over the local connection.

As used herein, the term "path" refers to a communication link or connection that can be, for instance, a wireless connection (e.g., via a radio) or a wired connection (e.g., a Ethernet connection). In one embodiment, for a given connectivity group 101a-101n, the member UEs 107a-107i have at least a local path or connection among the members of the group and at least one network path for sharing over the local path. In another embodiment, not all members of the group 101a-101n need to have both a network path and a local path to participate in a group. In this case, members with no network path or connection can nonetheless share the network path provided one or more other members. In yet another embodiment, the same physical connectivity component (e.g., a radio, a wired network port, etc.) may provide for multiple paths (e.g., one or more network connection, one or more location connections) over the same component.

It is noted that members of a connectivity group 101a are able to connect to every other member of the group 101a either directly via a direct path or through one or more of other UEs 107 in the group 101a. Similarly, every member of the connectivity group 101a can access the network either directly, if the UE 107 is equipped with a path for network connection (e.g., the UE 107 is activation capable), or via one or more of other UEs 107 in the group 101a, when the UE 107 is only equipped with a local path or for any technical reason unable to activate its network path (e.g., the UE 107 is activation incapable).

In another embodiment, an unactivated UE 107a-107i may send computation closures representing the information, by means of local path over to the activated UE 107a-107i, where the activated UE can use its connection path to distribute the computation closures to the communication network 105.

The connection sharing platform 103 may circulate activation process among the participating UEs based on a schedule so that each activation capable participating UE can have its turn of activation. For example, a closure may include an HTTP request where each HTTP request is its own transaction and each closure can represent one transaction. As an example, the connection sharing service may be offered in a public place such as a train station, inside a bus or train, an airport, etc. where a large number of users may be attempting to connect to the network simultaneously. In such case a local area connection can be established to provide the local communication among UEs 107a-107i. Alternatively, the local communication among UEs may be remotely managed by an infrastructure such as the information space management system (not shown). As an example, if connection path between a UE A and a network G is represented as AG, the resources (e.g. energy) consumed for the connection is represented as E (AG), and n UEs $A_1, A2, \ldots, A_n$ are trying to connect to the network G separately (assuming that all UEs are activation capable), the total energy $E_{T1}$ consumed for n individual connections will be the sum of energies consumed for each connection $$E_{T1} = \sum_{i=1}^{n} E(A_i G)$$

wherein each connection AG is a network connection. However, if one UE $A_{act}$ is activated for establishing a network connection for the rest of UEs $A_1, A2, A_n$, the total energy $E_{T2}$ consumed will be $$E_{T2} = \sum_{i=1}^{n} E(A_i A_{act}) + E(A_{act} G)$$

wherein E $(A_{act} A_{act})$=0, $A_{act}G$ is a network connection, and each $A_i A_{act}$ is a local connection. It is noted that the energy consumption for a local connection is considerably lower than energy consumption for network connection, and therefore it can be concluded that $E_{T2} < E_{T1}$.

By way of example, the UEs 107a-107i, and the connection sharing platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
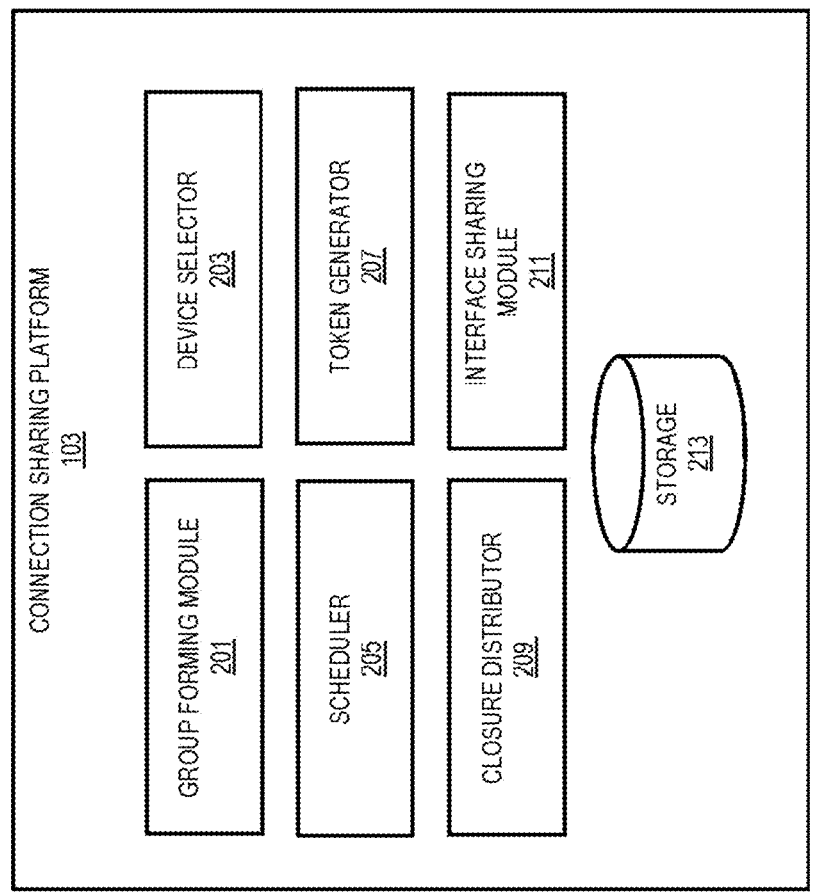
FIG. 2 is a diagram of the components of connection sharing platform, according to one embodiment.

FIG. 2 is a diagram of the components of connection sharing platform, according to one embodiment. By way of example, the connection sharing platform includes one or more components for providing shared path connectivity among devices. It is contemplated that the functions of these components may be combined in one or more components or performed by other components of equivalent functionality. In this embodiment, the connection sharing platform 103 includes a group forming module 201, a device selector 203, a scheduler 205, a token generator 207, a closure distributor 209, an interface sharing module 211, and a storage 213.

The UEs 107a-107i have connectivity to the information spaces 113a-113n via an information management infrastructure (not shown). In one embodiment the connection sharing platform 103 receives a request from one or more UEs to join a group connection and processes the request. The requesting UE may publish its willingness to join a connectivity group along with its local connectivity details and other information, which may include the operator information and location. The UEs may be equipped with specific services such as energy saving mode providing saving of the battery life by joining a connectivity group. The energy saving mode may be optionally selected by the user of the UE, automatically activated by the provider or a combination thereof.

Following the receipt of request for joining a connectivity group the group forming module 201 may obtain information about the existing connectivity groups from storage 213 and assign the requesting UE to an existing group, update the group information in the storage 213 accordingly and provide means for the device to use local connectivity to join the group. The group forming module 201 may initiate a new connectivity group for the requesting UEs. However, group selection by UEs may lead to conflicts among UEs as different UEs may try to join the same group. If any conflicts arise, the group forming module 201 may resolve the conflict by taking measures such as adding UEs to groups based on predefined priorities, creating new groups with capabilities similar to the popular groups, etc.

In one embodiment, joining a connectivity group may be restricted according to certain criteria such as social factors (e.g., similar browsing habits), shared content, similar commuting paths, etc.

In other embodiments, resources other than network resources may also be shared among UEs. For example, UEs may join groups for sharing computing power, input/output devices (e.g., microphones, speakers, displays, etc.). Furthermore, in addition to HTTP, a stream over IP (such as audio or video) may also benefit from this mechanism for resource sharing among UEs.

Subsequent to new UEs joining a group, the scheduler 205 updates the UE activation schedule based on the new group arrangements and defines a new circulation schedule among the UEs. The device selector 203 activates one or more of the UEs of the connectivity group based, at least in part, on the schedule provided by scheduler 205.

In one embodiment, the scheduler 205 may determine one or more parameters to be used for defining an activation schedule. The parameters may include a number of the UEs, one or more characteristics of the local connection, one or more characteristics of a path for local connectivity, one or more characteristics of the network connection, one or more characteristics of a path for network connectivity, a turnover rate of the UEs, or a combination thereof.

In one embodiment, each activation capable UE of the connectivity group that is equipped with a network path, will be activated and accept the network path connection responsibility based on the schedule, wherein the UEs of the connectivity group with no network connection capability (activation incapable) will remain unactivated and connect to the network via the activated UEs. Upon being activated, the activated UEs will have the path responsibility, which include handling network connection for unactivated members of the group by obtaining the related computation closures from unactivated UEs via the closure distribution 209, executing the computation closures over the network connection, obtaining the execution results and transmitting the results to the originating unactivated UEs via the closure distributor 209 over the local connections. A UE's turn as an activated UE is completed either after a preset time based on the schedule or in certain cases when all of the computation closure executions have completed.

In one embodiment, prior to the transfer of activated state from one UE to next UE in the group, the path may be put in hibernating or shut down state, the computation closures may be passed to the next UE by closure distributor 209 (alternatively, the computation closures may be the same so that they do not need to be resent) via the local connectivity and the unactivated UE which requested the network connection waits for receiving closure execution results via the closure distributor 209 over the local connectivity.

In case of HTTP requests each computation closure can encode a HTTP request, which entails sending a method (GET, POST, PUT, etc.) and then waiting for the HTTP response, which usually completes the request. In this case the implementation of the path responsibility turn would be particular to HTTP and the turn would be completed when each request obtains a response.

In one embodiment, the circulation of the activation state among activation capable UEs in a group comprises passing a token among the UEs. This is enabled by a mechanism for determining each activation capable UE's turn to be activated which may be implemented by passing a "token" among the participants. The token gives a UE the responsibility for interacting with the network (nonlocal) radio interface. In this embodiment, the token generator 207 generates and passes a token to the UE that is being activated. Triggering of passing of token is based on the schedule provided by the scheduler 205. As described before, the schedule is calculated based on various parameters, including, but not limited to, the total number of UEs in the group, number of activation capable UEs in the group, characteristics of the network path, break-even time (the amount of time after which the switching on the path interface becomes efficient), rate of UEs joining or leaving the group, etc.

It is noted that typically a user may decide to join a connectivity group based purely on egoistic motivations and not considering more altruistic motives such as the fact that others will also save energy or that it is a greener alternative. Subsequently, the main principle for the design of connection sharing is fairness so that every activation capable member is contributing equally to the group and minimizing the space for parasites or free riders who only use a resource shared by others but never share any of their own resources.

In one embodiment, the connection sharing platform 103 may apply strategies for prioritizing connections based on the amount of contribution by each UE in the group or by each UE owner. For example, if a user has multiple, activation capable UEs in the group, the user's activation incapable UEs may receive a higher connection priority (or a lower connection cost) compared to a user who owns only activation incapable UEs which do not contribute to the group and only use the resources.

In various embodiments, the connectivity group environment may be very dynamic in the sense that participants may join and leave the group without any prior notice. Therefore, the token generator 207 may take this fact into consideration in order to preserve fairness among group members for UE activation. Ideally, all group participants shares their network resource(s) for an equal amount of time so that $T_i$, the sharing time for UE i is $T_i=T/n$, where T is the total interaction time $$T = \sum_{i=1}^{n} T_i$$

and n is the total number of participant UEs in the group. However, T, the total interaction time within a certain connectivity group configuration, is unknown a priori and therefore for achieving fairness the token generator 207 may approximate the total T. Various approaches of approximation may be adopted such as centralized approximation or decentralized approximation.

In one embodiment, the centralized approach may be used where the connection sharing platform 103 keeps track of the time share (activation time, usage time, etc.) for each UE member of the connectivity group and set up a credit system accordingly, similar to the function of distributed peer-to-peer networks.

In another embodiment, a decentralized setting may be adopted wherein fairness is ensured by way of adjusting the time share for each UE member of the connectivity group according to the group environment. In this embodiment, the time share may depend on several factors, such as the total number of participants, number of activation capable participants, the joining and leaving rates, etc. In addition, in order to minimize the use of resources by free riders, new participants in the group may automatically be selected by the device selector 203 to be the next UE to be activated by receiving a token from the token generator 207.

In one embodiment, the local connection among UEs in a connectivity group may be provided using Bluetooth technology. The Bluetooth technology allows sharing of various devices and components such as user interfaces. In this embodiment, sharing of user interface is managed by the interface sharing module 211. The interface sharing is discussed in more detail in FIGS. 8A-8C.

Figure 3:
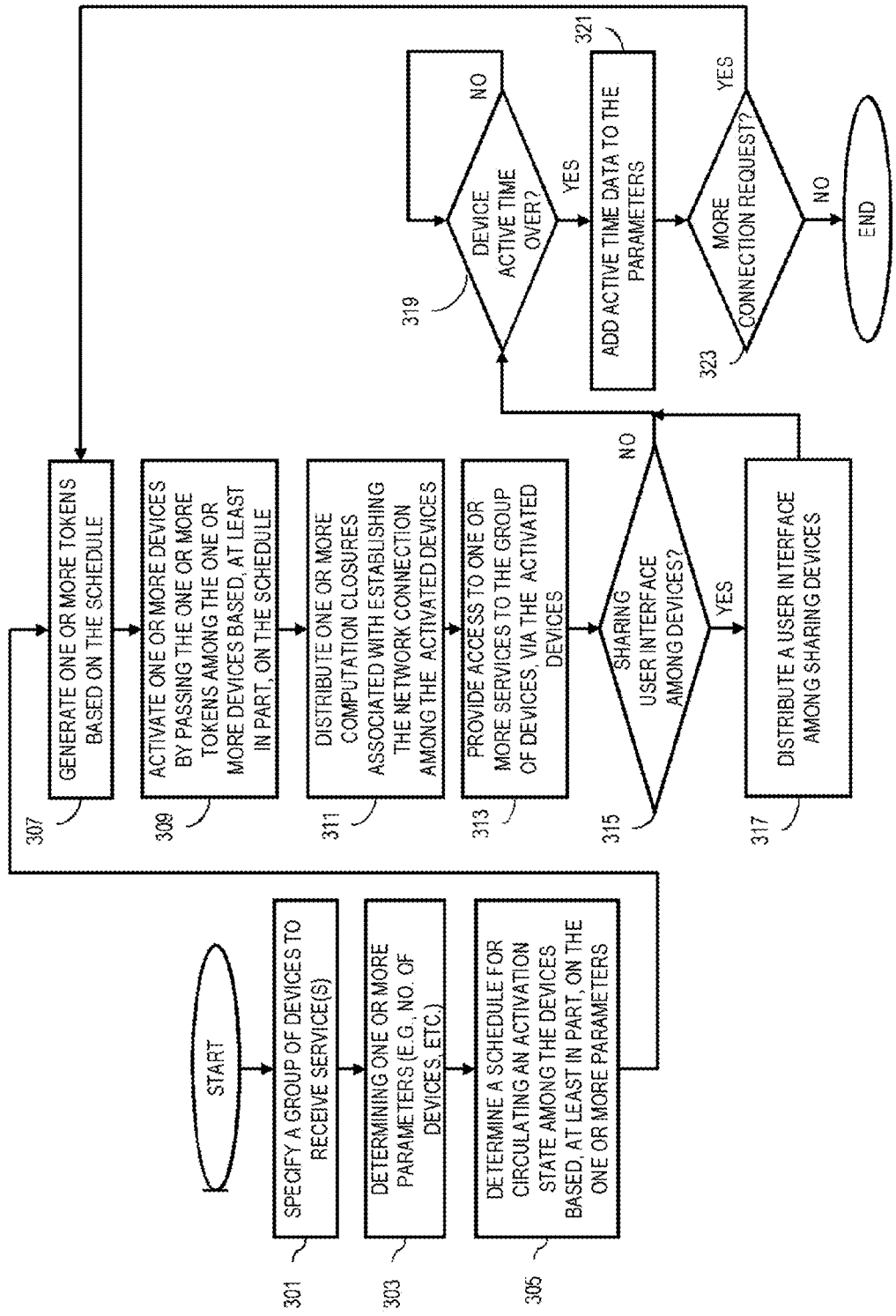
FIG. 3 is a flowchart of a process for providing shared path connectivity among devices, according to one embodiment.
Figure 9:
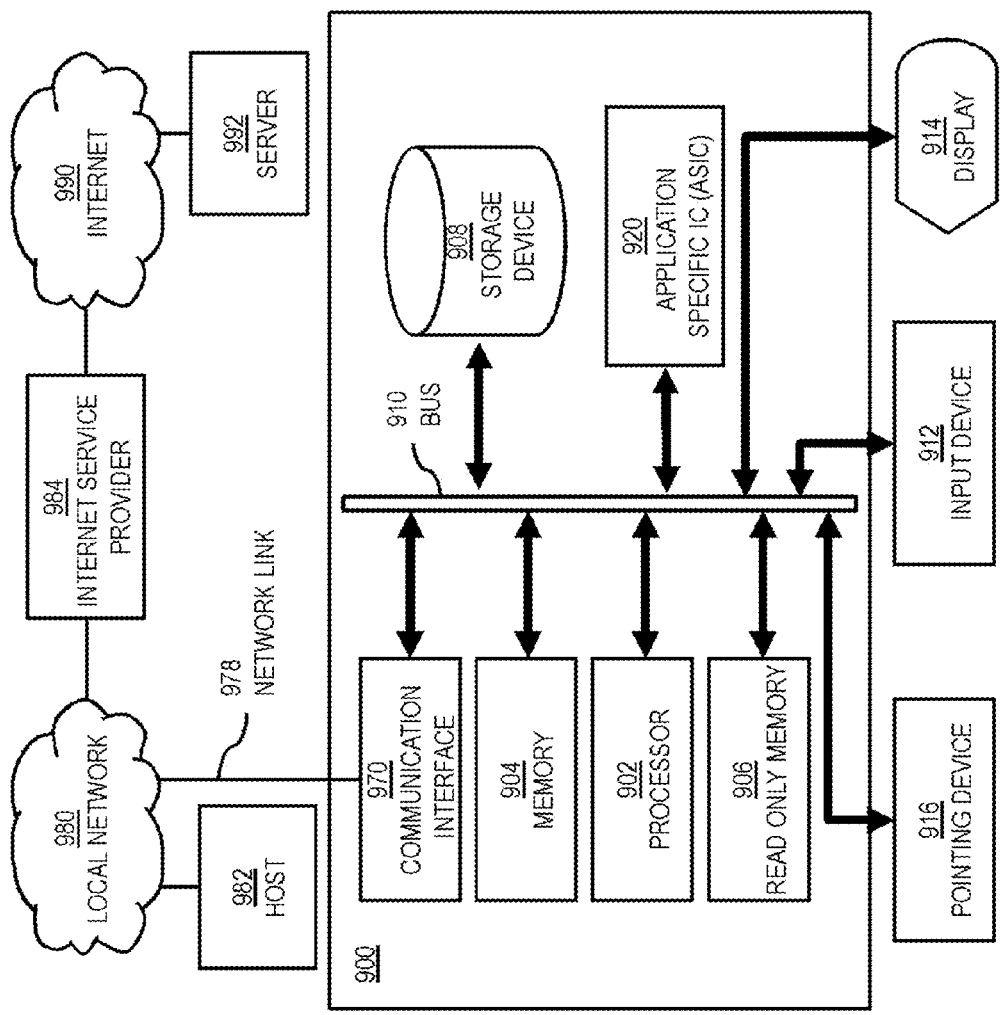
FIG. 9 is a diagram of hardware that can be used to implement an embodiment of the invention.

FIG. 3 is a flowchart of a process for providing shared path connectivity among devices, according to one embodiment. In one embodiment, the connection sharing platform 103 performs the process 300 and is implemented in, for instance, a chip set including a processor and a memory as shown in FIG. 9. In step 301, the group forming module 201 identifies a group of UEs to form a connectivity group and to be able to share a network connection path.

The connectivity groups may be formed by the group forming module 201 based on user request or automatically based on the network setup. Furthermore, the user of a UE 107a-107i may be given the option to select an existing connectivity group to join. Alternatively, the group forming module 201 may select a group for the user to join based on various parameters such as device characteristics, type of the requested service, etc. In step 303 the group forming module 201 determines parameters needed for forming new groups or adding UEs to existing groups. The UE 107a-107i may query the connection sharing platform 103 for existing connectivity groups and also query the data required to join the existing group, for example local connectivity, operator, as well as whether the group is full or has capacity for new UEs. The group forming module 201 check the storage 213 for connectivity group information to see whether a local group with at least one activated UE already exists in the vicinity of the requesting UE.

In step 305, the scheduler 205 determines a schedule for activation of the UEs which are members of updated connectivity groups (the groups that either were newly formed or updated by adding new UEs or leaving existing UEs). Various parameters such as number of devices, characteristics of local and network connections, etc. may be considered for schedule arrangements. In step 307, the token generator 207 generates tokens to be sent to UEs for activation. In step 309, the device selector 203 identifies the UEs that should be activated next, based on the schedule, and passes the generated tokens to the identified UEs. At this stage the activated UEs are ready to start communication with the network. In step 311 the closure distributor 209 retrieves the computation closures associated with establishing the network connection and distributes the closures to the activated UEs. The closures may be obtained from storage 213, or from user processes 117a-117m via the communication network 105 or a combination thereof. In step 313 the activated UEs facilitates various services provided by the network to the members of the connectivity group. The services may include browsing services, media (audio, video) access, etc.

In one embodiment two or more UEs in the connectivity group may share one or more user interfaces for receiving network services. Examples of shared user interfaces are described with respect to FIGS. 8A-8C. If at least one shared user interface exists, in step 317 the interface sharing module 211 distributes the shared user interface among the sharing UEs so that the sharing UEs can access the provided network service via the shared user interfaces. In step 319, the scheduler 205 checks whether it is time for the activated UEs circulation using the schedule. If the time for activated UEs circulation has reached, per step 321 data related to the current active time is added to the storage 213. The scheduler 205 uses this data to modify the activation schedule accordingly. In step 323 the group forming module 201 checks whether more pending request or predefined procedure for connection sharing exist. If there are no pending requests the process ends, otherwise, the process will continue from step 307 where tokens for activation of next UEs on the schedule are generated.

Figure 4:
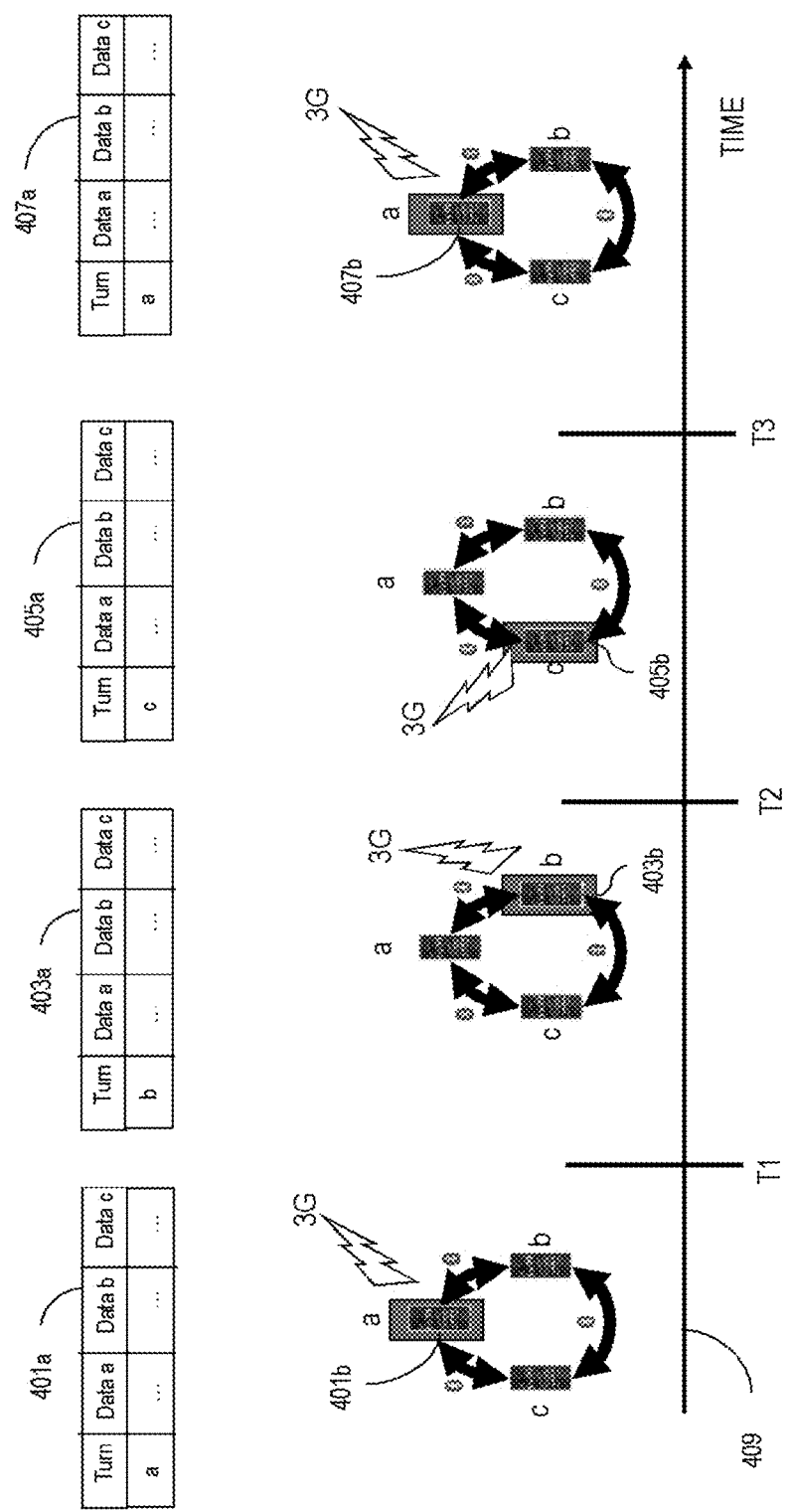
FIG. 4 is a diagram of a scheduled shared path connection, according to various embodiments.

FIG. 4 is a diagram of a scheduled shared path connection, according to various embodiments. FIG. 4 represent a connectivity group consisting of three UEs a, b, and c. As seen in FIG. 4, table 401a and diagram 401b represent the case where UE a is assigned as the activated UE and is connected to network 3G. Other UEs b and c have connectivity to network 3G via Bluetooth through UE a. Table 4a is the schedule table that shows UE a as the current activated UE. The time axis 409 show that the UE a will be activated for duration T1. At time T1 when a's active time is over, the scheduler 205 updates schedule to table 403a and the device selector 203 assigns UE b as the activated UE based on the schedule. The token generator 207 generates a token and passes the token to UE b. The closure distributor 209 distributes computation closures associated with the sharing to UE b; and b starts acting as the network connection path for the group. As seen in diagram 403b, UE b is connected to network 3G while UEs a and c have connectivity to network 3G via Bluetooth through UE b. Similarly, at time T2 UE b's active time is over, the scheduler 205 updates schedule to table 405a and the device selector 203 assigns UE c as the activated UE based on the schedule. The token generator 207 generates a token and passes the token to UE c. The closure distributor 209 distributes computation closures associated with the sharing to UE c; and c starts acting as the network connection path for the group. As seen in diagram 405b, UE c is connected to network 3G while UEs a and b have connectivity to network 3G via Bluetooth through UE b. By ending the active time for UE c at time T3 the UE a starts its second turn as the activated device as seen in table 407a and diagram 407b. This trend may continue until one or more of the UEs close their connection or new UEs are added to the group, when either the network connection continues with an updated schedule or the connection ends.

Figure 5:
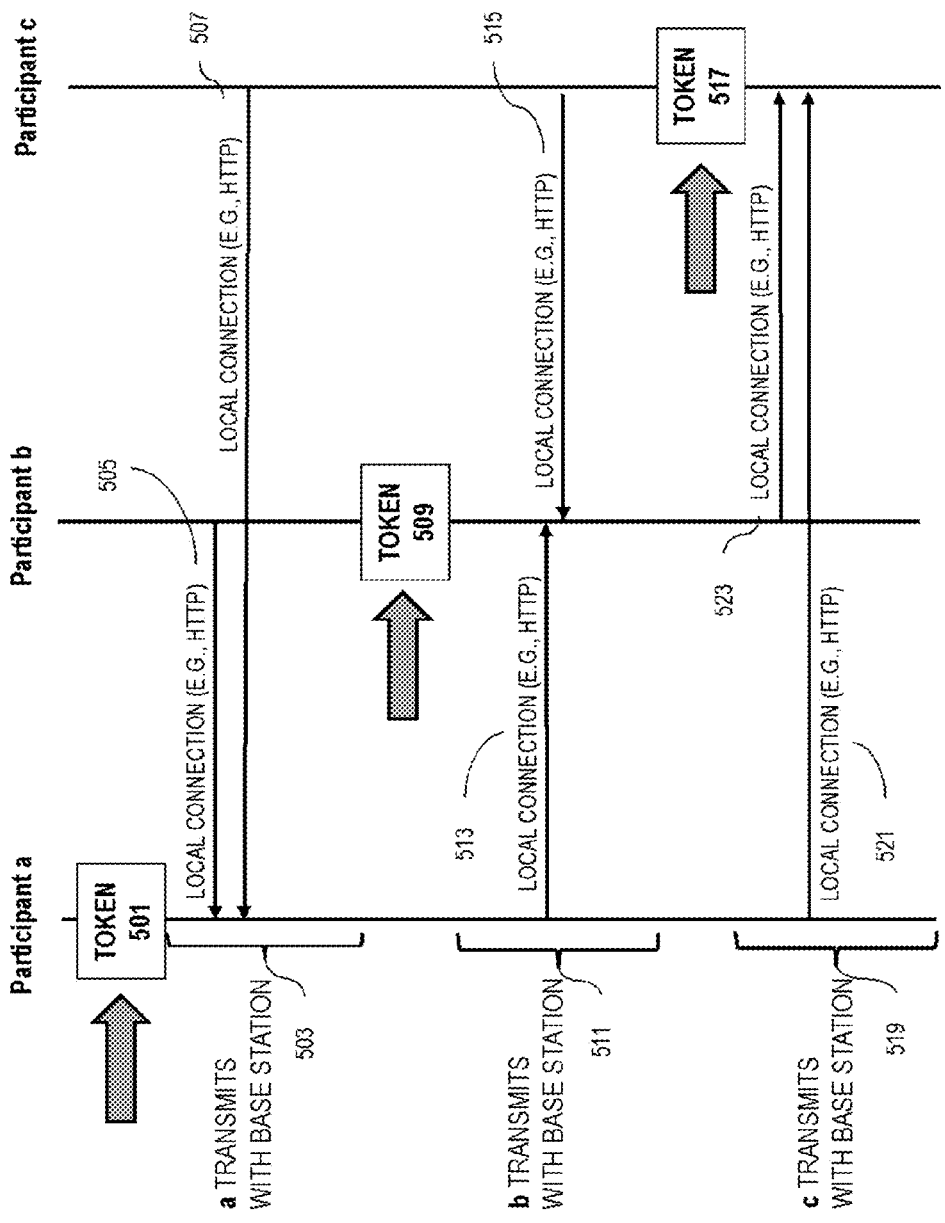
FIG. 5 is a diagram of passing tokens, according to various embodiments.

FIG. 5 is a diagram of passing tokens, according to various embodiments. In the diagram of FIG. 5 three UEs a, b, and c are members of a connectivity group. Token 501 sent to UE a from token generator 207 indicates a's turn to be the activated UE for a duration indicated by 503. During time period 503 other UEs b and c communicate with UE a, using local connections 505 and 507 in order to share the network connection provided by UE a. Following the end of time period 503 the token generator 207 sends token 509 to UE b and b's activation period 511 starts during which UEs a and c communicate with UE b, using local connections 513 and 515 in order to share the network connection provided by UE b. Similarly, after end of time period 511 the token generator sends token 517 to UE c and c is the activated member of the connectivity group for time period 519 during which a and b communicate with UE c, using local connections 521 and 523 in order to share the network connection provided by UE c. The tokens 501, 509 and 517 are generated based on the schedule provided by scheduler 205. Furthermore, the schedule is being updated periodically so that the duration of time periods 503, 511, and 519 is fairly divided among activation group members a, b, and c.

The UEs participating in a connectivity group may establish local connections among themselves in various ways. In one embodiment, an unactivated UE may send a connection request to the activated UE within the connectivity group. For example, the request may be a HTTP request, wherein the activated UE has established a HTTP session with the network. In this case, after establishment of the local connection, the unactivated UEs participating in the connectivity group are able to share the HTTP session established by the activated UE.

Figure 6:
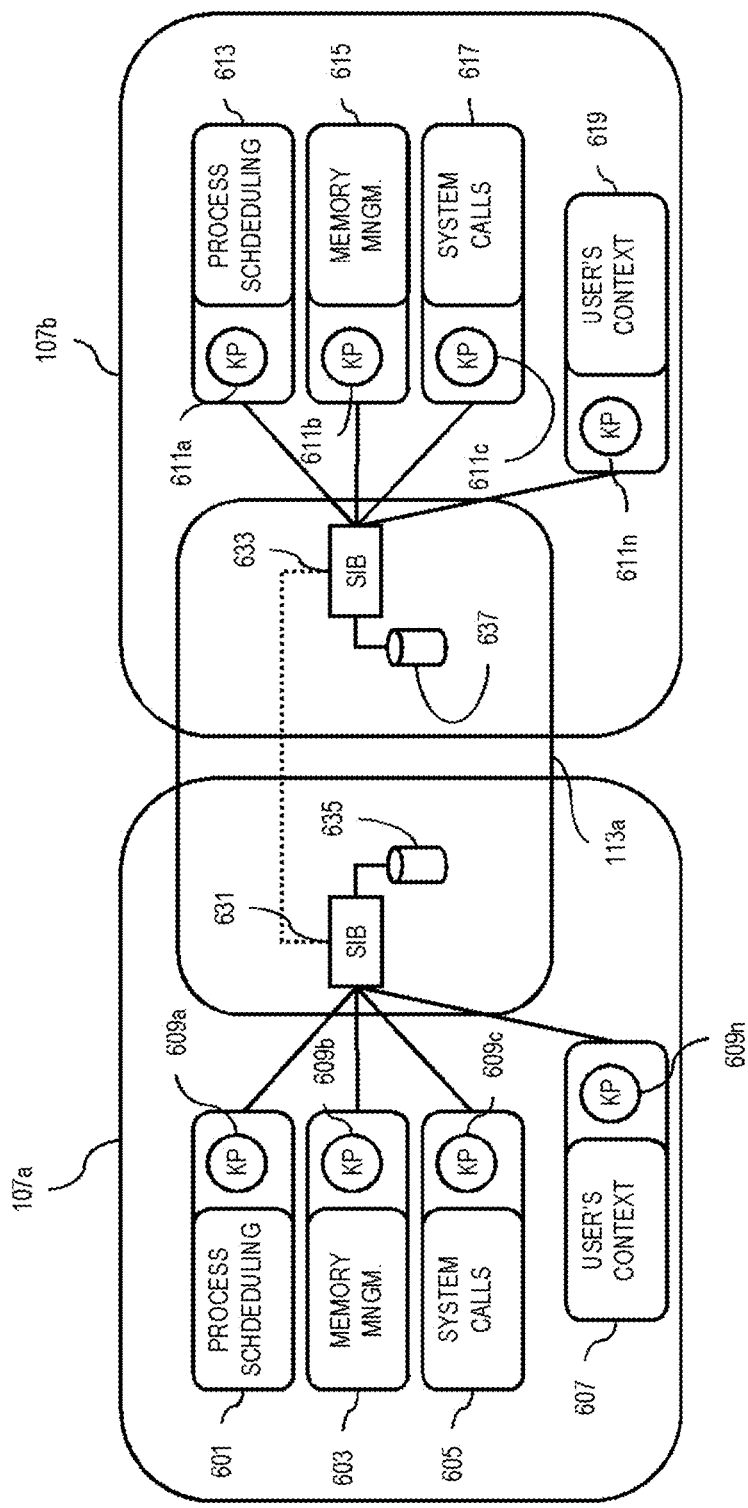
FIG. 6 is a diagram of sharing computation closures, according to one embodiment.

FIG. 6 is a diagram of sharing computation closures, according to one embodiment. The user may own an information space set 113a which is distributed between devices 107a-107i and other remote devices having connectivity to via communication network 105. The information space set 113a includes Semantic Information Brokers (SIB) 631 in UE 107a, the SIB 633 in UE 107b. Additionally, each information space in set 113a has knowledge processors (KPs) 609a-609n in UE 107a and 611a-611n in UE 107b. Furthermore, the information space may utilize storage components 635 and 637 of the devices involved in the information space. The SIBs of information space set 113a may communicate with each other (shown with dotted lines).

Typically, during an information processing lifecycle, one or more execution contexts that may be represented in RDF form based on sub-graphs are stored by a SIB 631 of an information space 113a. The user context and execution context may result from execution of a program code of an application by a knowledge processor KP 609a-609n and stored in memory 635 of UE 107a which is utilized by SIB 631. If a KP 609a-609n of UE 107a detects that the UE 107b is attempting to communicate with UE 107a over a communications medium, UE 107a can share the user and execution contexts over a communications connection in the communications medium with UE 107b for continued or enhanced execution of an application by a KP 611a-611n in UE 107b. Following the completion of the process on UE 107b, the UE 107a may receive an alert from the SIB 631 indicating closing of the communication connection with (for example stationary wireless) UE 107b. In this case, UE 107a may receive updated user and execution contexts from the UE 107b over the communications connection so that the UE 107a can continue the execution of the application on a KP 609a-609n.

In one embodiment, the information and execution contexts to be shared between UE 107a and UE 107b may be associated with sharing a network connection among the UEs provided by the connection sharing platform 103. It is noted that a communications medium can be physical or logical/virtual, but in this embodiment all managed by the connection sharing platform 103. The sharing of the user and execution contexts and reflective process execution of the applications associated with connection sharing on KP 611a-611n of UE 107b is managed by the connection sharing platform 103. The connection sharing platform 103 shares and provides reasoning about user and execution contexts between UE 107a and UE 107b with SIBs 631 and 633. For example, UE 107a may be a mobile wireless with a network path and UE 107b may be a mobile device with a local path.

The connection sharing platform 103 enables aggregation of user and execution context information and scheduling of the run-time environment. This enables changes to be made to one or more user contexts 607 and 619 and execution contexts (not shown). Changes to user and execution contexts may include starting, executing, scheduling, and dispersing, and aggregating of information related to connection sharing within the environment of the information space set 113a processes or tasks wrapped through KPs 609a-609n and 611a-611n or other KPs functionalities such as process scheduling 601 and 613, memory management 603 and 615, system calls 605 and 617, etc.

KPs 609a-609n and 611a-611n and their corresponding information in the form of RDF sub-graph dispersion and aggregation may be performed by selective recycling apparatus of the information space set 113a and/or the distribution. Selective recycling may be driven by a recovery-conscious scheduler that may be part of the information space environment scheduler and supported by information provided by the computing environment processes/tasks scheduler 601 and 613. The user contexts 607 and 619 and the execution contexts (not shown) related to connection sharing may be dynamically assigned and triggered by the connection sharing platform 103 and allocated according to a particular or operating system task management. It is noted that the terms KP and relevant information within SIB, represented as RDF sub-graph sets are abstract enough to be presented through other procedural aspects of the computing environment (e.g. a higher abstraction level).

In one embodiment, following the receipt of one or more user contexts 607 and 619 and additional execution contexts by UE 107b from UE 107a, and other relevant information over a communications medium, the UE 107b executes or shares the reflective state of the application by a KP 611a-611n. Upon completion of the process, the UE 107b may determine the information shared with SIB 633 through corresponding KP 611a-611n. This determination may result in closing a secure communication link with UE 107a. Prior to closing the communication connection, the UE 107b may share one or more user and execution contexts with UE 107a over the communications medium for continued execution of the application by KP 609a-609n in UE 107a. The sharing of the user and execution contexts and execution of the application on UE 107a is managed by the connection sharing platform 103. Such virtual run-time environment enables shared user and execution context sessions between UE 107a and UE 107b.

In another embodiment, prior to closing of the communication connection, the UE 107b may share an initial portion of the updated user and execution context with UE 107a over a initial communication connection and share the remaining portion of the updated user and execution contexts with UE 107a over the last communication connection for continued execution of the application on UE 107a. The adaptive computing platform described enables granular information processing context migration capability for a computing device to enhance the processing power of the devices within the information space environment.

Figure 7:
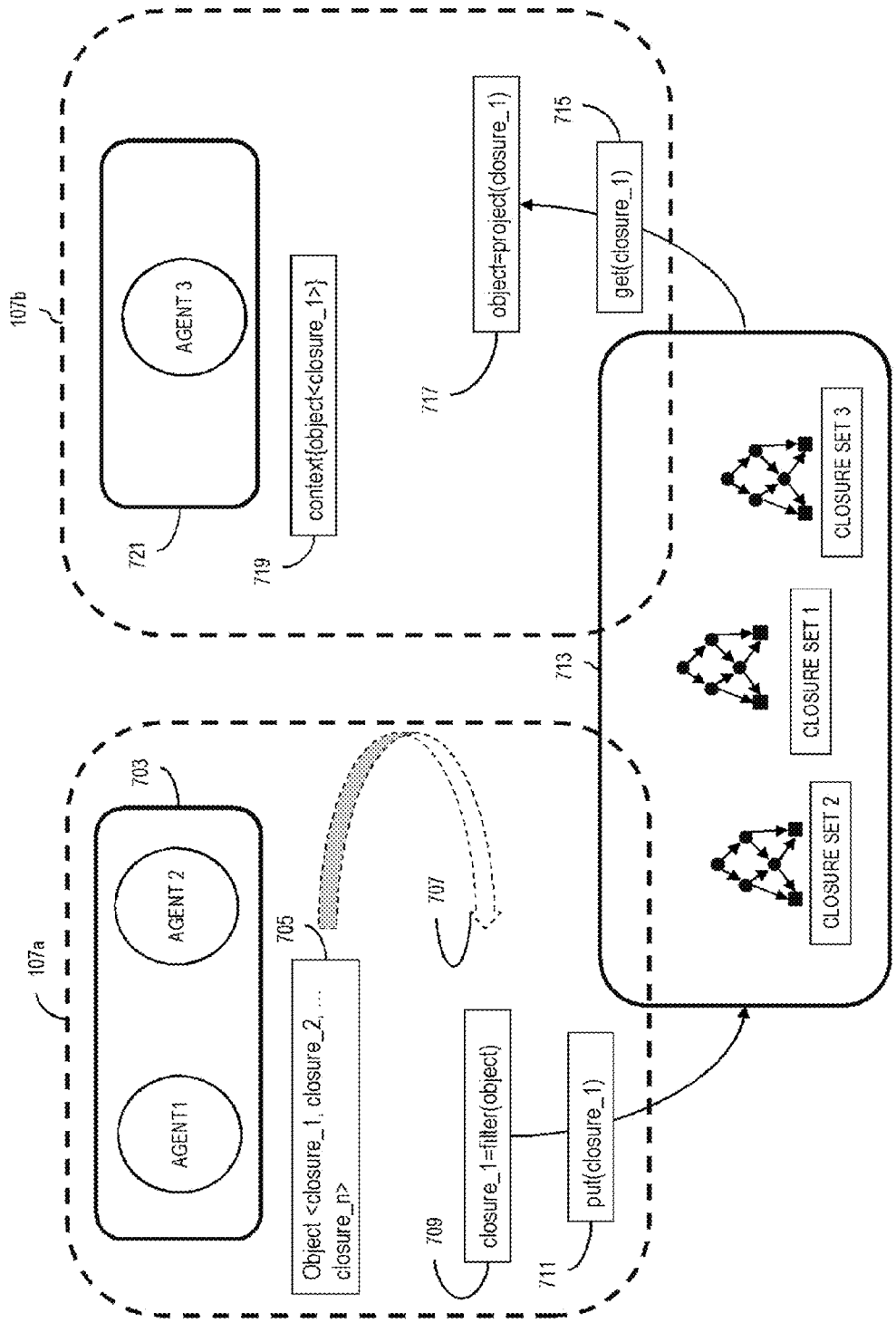
FIG. 7 is a diagram of process migration from a device to another device, according to one embodiment.

FIG. 7 is a diagram of process migration from a device to another device, according to one embodiment. In one embodiment, the UE 107a may include a user context 703 for every user of UE 107a. In one embodiment, the user context 703 may include computation closures to enable UE 107a to be activated and function as a connection point to the network for other UEs in its vicinity. Agent1 and agent2 may be processors that calculate and handle computation closures within the user context 703. The number of agents may be different in different devices based on their design, functionality, processing power, etc.

Assuming that UEs 107a and 107b are members of a connectivity group created and managed by the connection sharing platform 103, where UE 107a is activated and connected to the network providing network and locally connected to UE 107b (for example via Bluetooth) and UE 107b is unactivated and connected to the network via UE 107a. As previously discussed, the UEs in a connectivity group take turns for being activated and therefore all of the UEs should be equipped with the computation closures required for activation and network connection. It is assumed in this example that user context 703 provides UE 107a with such computation closures while UE 107b, which may have just joined the connectivity group, may lack required closures for activation. Therefore user context 703 and corresponding computation closures are migrated or otherwise provided to UE 107b in order for UE 107b to be activated. The migration process may be initiated by the group forming module 201 upon adding UE 107b to the connectivity group. The group forming module 201 activates Agent1 and Agent2 which initiate migration of the computation closure 705 to the information space 113a.

Block 705 represents an Object as a set of computation closures (e.g., closure_1, closure_2, . . . , and closure_n) where each closure is a component of a larger process, for example, related to a service provided to the user by the user equipment 107a such as a shared path connectivity. Each closure can be a standalone process that can be executed independently from the other closures. In the example of FIG. 7, the filtering process 707 extracts closure_1 from the closure set Object via filtering the set (shown in block 709). The extracted closure_1 is added to a computation closure store 713 using the exemplary Put command 711 by the closure distributor 209. In this example, assuming that the extracted computation closure, closure_1 is supposed to be executed on the user equipment 107b, the user equipment 107b extracts the computation closure closure_1 from the computation closure store 713 using the Get command 715.

In one embodiment, the decision of the equipment on which a computation closure is executed, may be automatically assigned by device selector 203. The extracted closure_1 is projected into a closure with the user device context (process states) and the object 717 is produced on UE 107b. The block 719 represents the reconstruction of the closure into the initial context by the closure distributor 209. The aggregated context may then be executed in the run-time environment 721 of UE 107b by Agent3, allowing UE 107b to function as the activated UE within the connectivity group when its turn comes.

In another embodiment, the information related to activation process which is transferred from UE 107a to UE 107b via computation closure store 713 is converted into computation closures in RDF format by the information space management system (not shown), if they are not already in RDF format. The migration processor Agent3 of UE 107b, which may be part of a larger process 721, and may be written in languages different from processors Agent1 and Agent2 in UE 107a (e.g. Python® or JavaScript®), enable the migration of the process into the UE 107b.

Upon receiving the process migration information at the UE 107b, activation of the Agent3 may trigger resumption of the execution of migrated computation closures within context 719 which enable UE 107b to be activated.

Figure 8B:
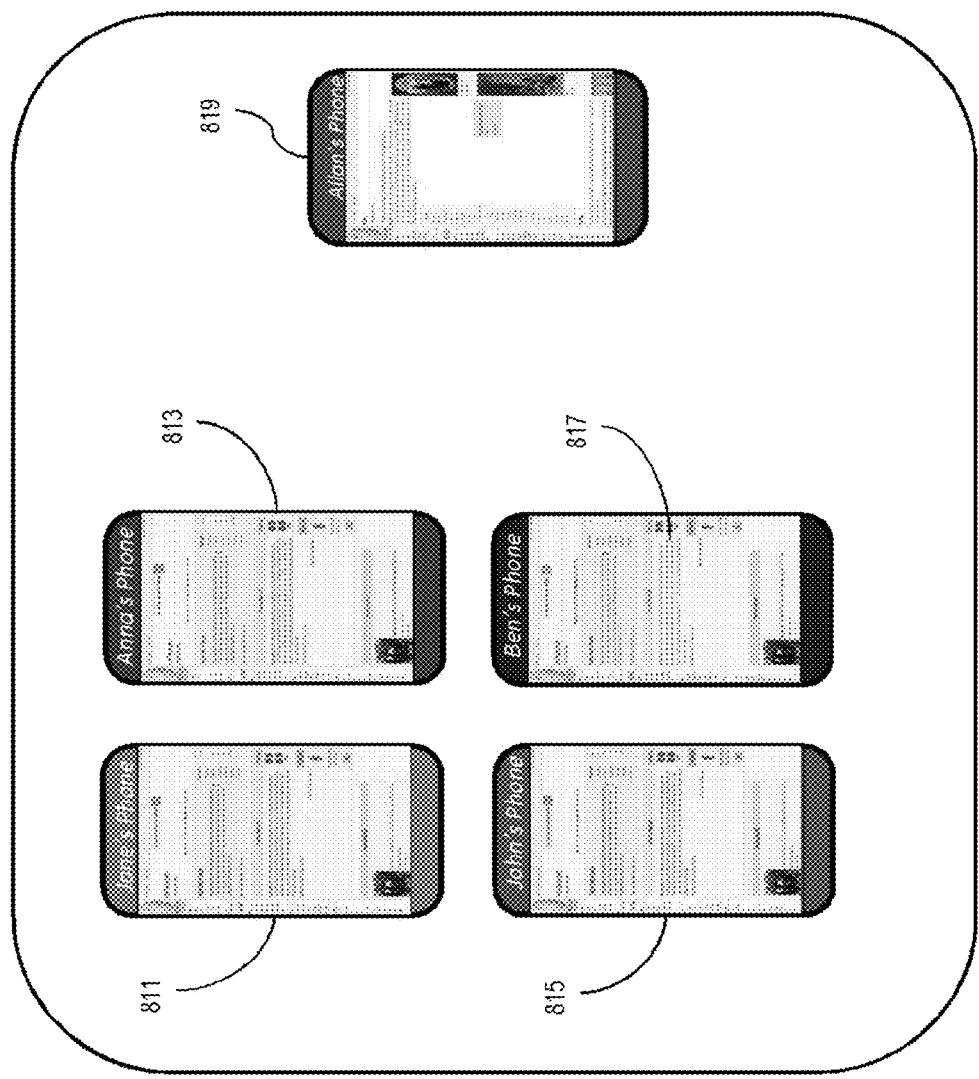
Figure 8C:
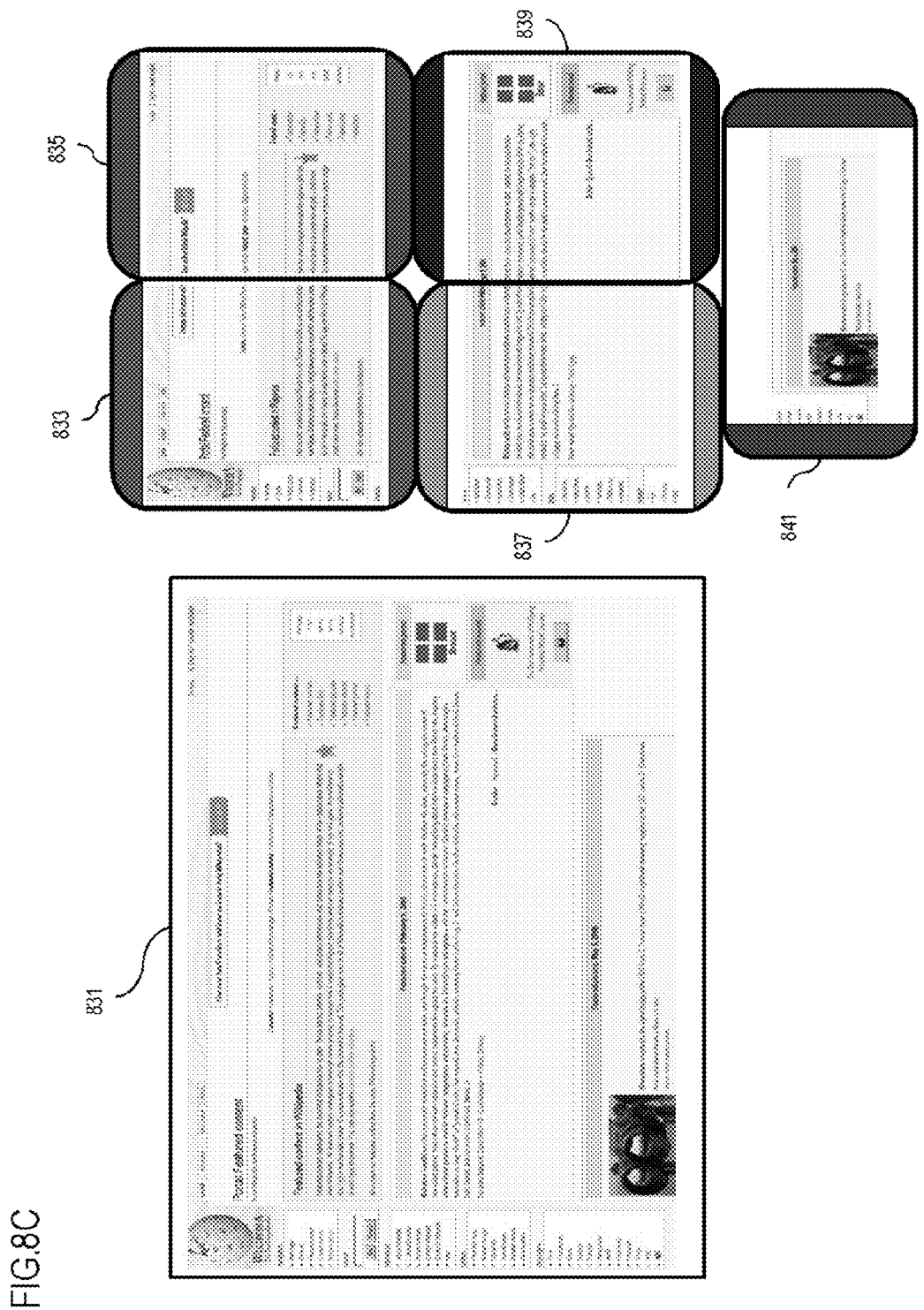

FIGS. 8A-8C are diagrams of user interface sharing, according to various embodiments. Currently, Bluetooth technology usage allows sharing of objects stored on a UE such as images, audio, video, documents, business cards, messages, notes, etc. Mobile web access is growing and becoming a more personal experience while still a collaborative platform.

Users may browse the internet individually or as a collective effort. If one user finds something interesting on his UE, he may wish to share the findings with others. Currently, this sharing of user interface can be provided by sharing the small UE screen together, for a small group of users, looking at the screen in turns, reading out the URL for the others to type into their browsers and access the page, or probably save the page and share it over Bluetooth.

Therefore, means are needed for users to share web links and pages, on demand, over Bluetooth, and other proximity channels, where the pages or links are automatically loaded to the browser for viewing such that the experience can be continued on another device. The means can provide collaborative browsing of the internet for users via their individual UEs, with a shared or split view of the target content or web page. Results of the interactions with the web artifact can be shared with other users if desired. FIG. 8A represents a use case where Jane and John are researching for their group assignment. In diagrams 801a and 803a each of Jane and John are using their individual mobile devices UE 107a-107i to access the internet. Jane finds a web page with interesting material. Jane shares the link with John over Bluetooth and as a result both users can see the same page simultaneously as seen in diagrams 801b and 803b.

In one embodiment, John is notified by the interface sharing module 211 of the shared link. He may choose to respond immediately or save the shared link to read later. If John chooses to view the shared page immediately, the link is loaded to the browser of his mobile device. He is now able to view and interact with the material and discuss with Jane. When done, he can close the page, or leave the window open, and resume his previous browsing activity. Otherwise, if John chooses to view the link at a later time, the shared link is queued for viewing on his mobile device. Later whenever John views the it is loaded to his mobile browser. He is able to view and interact with the page.

FIG. 8B represents a use case where Jane and John are in a group meeting with three other members of the team. John is presenting the findings of FIG. 8A for discussion. He opens a reference web page from his mobile phone. He selects share page browsing over Bluetooth, and then selects the Bluetooth devices of his teammates. John may select a private session in order to prevent outsiders from joining the session without being invited. The page is shared between user interfaces of UEs 811, 813, 815 and 817. As seen in FIG. 8B all user interfaces are showing the same page. The entire group has a shared view of the web page. Each user is able to interact with the page either privately or publicly.

In one embodiment, a user may choose to interact with the shared view privately. In this case user's interactions are not shared or updated on the screens of the other mobile devices. This also means that the user can have a different view of the page from the shared view. However, he can receive the shared updates of the other devices.

Alternatively, a user may decide to see the shared page as public. In this case the user's interactions are shared to and updated on the screens of the other paired mobile devices.

Following the sharing of the page by John, the group of UEs 811, 813, 815 and 817 in FIG. 8B share the session. They all share a common view of the page (page is cloned on other devices). Any changes or interactions made by anyone of them are shared with the others in the group. At the same time the session is private and thus access by others/externals is by invitation only.

In one embodiment Allan the owner of UE 819 decides to activate session in private mode. In this case, updates to the shared view are received by UE 819 but updates made by Allan are not reflected on other UEs 811-817. If Allan reverts to the shared mode he can find the latest view. The interface sharing module 211 may keep a trace of the updates made to shared page during the time when UE 819 was in private mode. The updates may be stored in storage 213 and presented to the UE 819 by the interface sharing module 211 when the UE 819 is reverted to public mode.

FIG. 8C represents a use case where John during his presentation need to zoom in some more on one of the pages. In this case he may instruct the other collaborating Bluetooth devices via his UE in a way that each of the devices has a part of the whole page and they can put together their devices for a unified view. Screen 831 in FIG. 8C shows the target view that John is trying to present to his team members. As seen in FIG. 8C the UEs 833, 835, 837, 839, and 841 are jointly displaying page 831 where each UE displays one part of the page and together the UEs 833-841 cover the whole page 831.

In another embodiment, a group of users may be browsing the internet when one of the group members' UE1 runs out of airtime, credit, talk-time, etc. In this case another user may agree to share his network connection via UE2 with UE1. He does this over Bluetooth and UE1 is able to browse. In this example, UE2 is activated and establishes a connection with the network while UE1 is unactivated and connects locally to UE2 via Bluetooth. In order to save UE2 on connection cost, the connection sharing platform 103 may cache pages requested by UE1 or UE2 or both locally on the requesting device's memory. As a result some of the requests are not needed to be sent to the internet and may be responded using local pages. Furthermore, UE2 may also connect with other local UEs over Bluetooth and check their cache for locally available services before attempting to communicate over the network.

The processes described herein for providing shared path connectivity among devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide shared path connectivity among devices as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing shared path connectivity among devices.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing shared path connectivity among devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing shared path connectivity among devices. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing shared path connectivity among devices, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing shared path connectivity among devices, to the UEs 107a-107i.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

Figure 10:
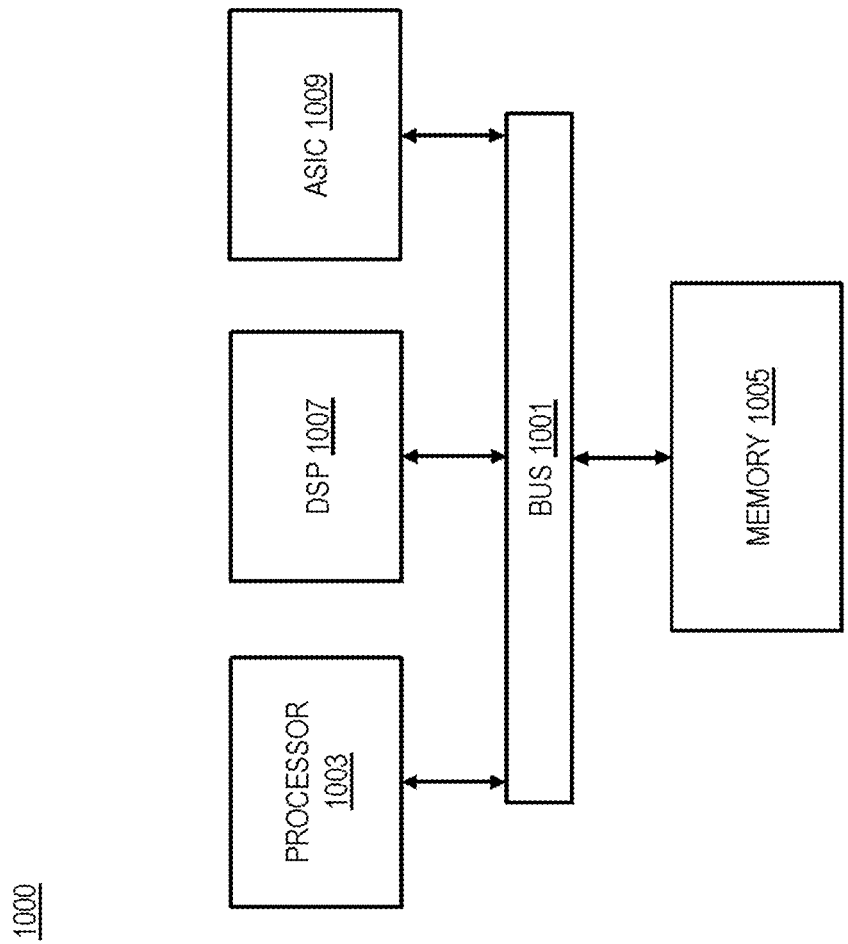
FIG. 10 is a diagram of a chip set that can be used to implement an embodiment of the invention.

FIG. 10 illustrates a chip set or chip 1000 upon which an embodiment of the invention may be implemented. Chip set 1000 is programmed to provide shared path connectivity among devices as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing shared path connectivity among devices.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide shared path connectivity among devices. The memory 1005 also stores the data associated with or generated by the execution of the inventive steps.

Figure 11:
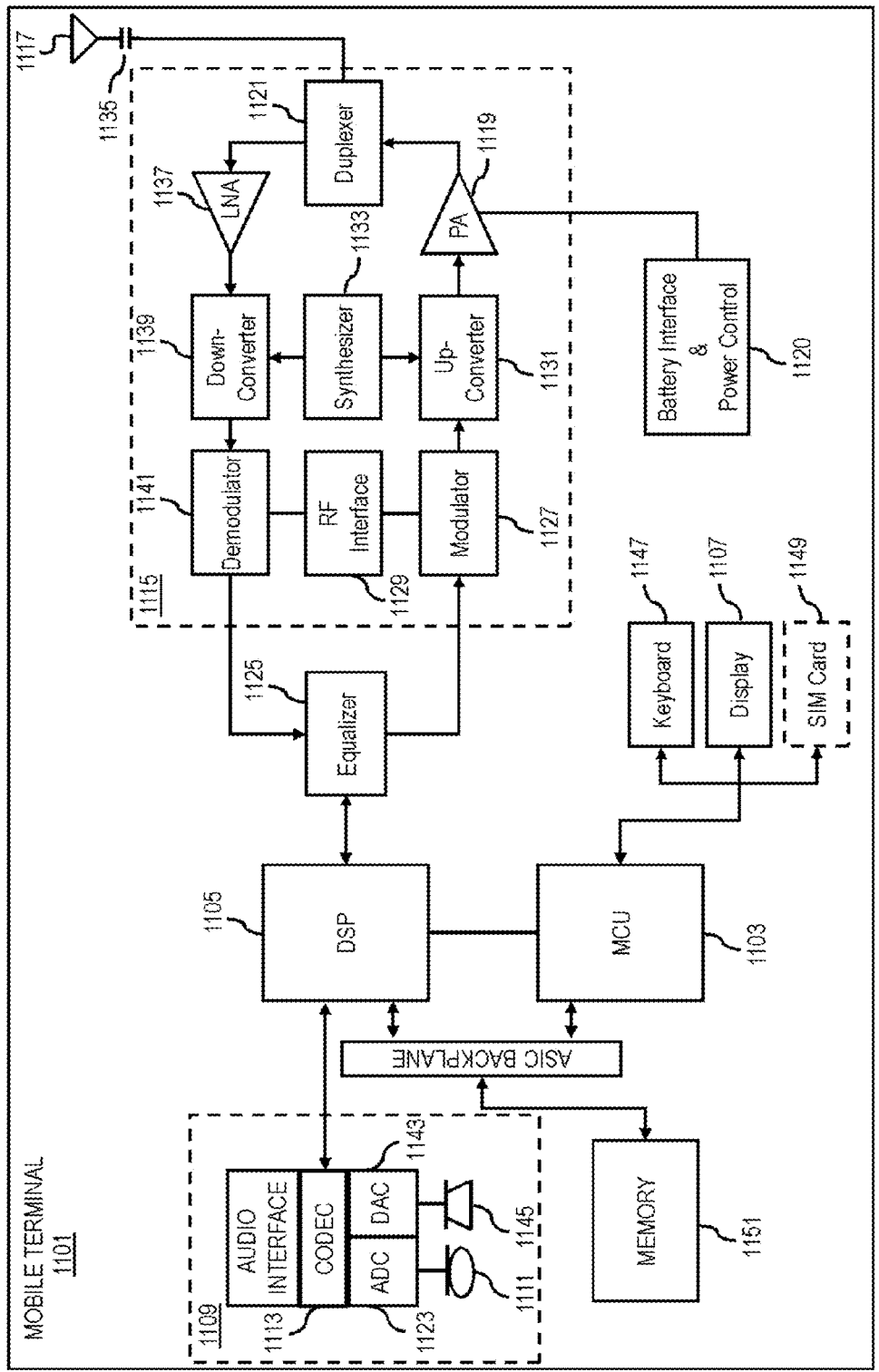
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing shared path connectivity among devices. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing shared path connectivity among devices. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide shared path connectivity among devices. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining to specify at least one group of user devices, the at least one group of user devices including at least a first path to establish a network connection and a second path to establish a local connection among the user devices, wherein each user device of the group of user devices includes one or more user interfaces; and
    determining to cause at least in part an activation of one or more user devices to establish the network connection,
    wherein one or more unactivated user devices share the network connection over the local connection,
    wherein two or more user devices of the at least one group of user devices are mobile terminals,
    wherein at least two of the two or more user devices of the at least one group of user devices are configured to establish a network connection and will be activated and accept the network connection responsibility to share the network connection over the local connection among the user devices of the at least one group of user devices,
    wherein the network connection comprises a cellular data service, and
    wherein an activated user device of the at least one group of user devices connects to the cellular data service and shares access to the cellular data service to unactivated user devices of the at least one group of user devices via the local connection,
    the method further comprising:
    determining a schedule for circulating an activation state among the user devices that are configured to establish a network connection for connection of the user devices that are configured to establish a network connection to the cellular data service,
    wherein the causing at least in part of the activation of the one or more user devices is based, at least in part, on the schedule, and
    wherein the circulating of the activation state comprises passing a token among the user devices that are configured to establish a network connection, and wherein the token represents a responsibility for establishing the network connection.

2. A method of claim 1, further comprising:
    determining one or more parameters including a number of the user devices, one or more characteristics of the first path, one or more characteristics of the network connection, one or more characteristics of the second path, one or more characteristics of the local connection, a turnover rate of the user devices, or a combination thereof, wherein the determining of the schedule is based, at least in part, on the one or more parameters.

3. A method of claim 1, further comprising:
    determining a duration for the activation of the one or more user devices that are configured to establish a network connection to enable a substantially equal sharing of the activation state among the user devices that are configured to establish a network connection,
    wherein the schedule is based, at least in part, on the duration.

4. A method of claim 1, further comprising:
    determining to cause at least in part a distribution of one or more computation closures associated with establishing the network connection among the user devices,
    wherein the causing at least in part of the activation of the one or more user devices comprises determining to cause at least in part an activation of the one or more computation closures.

5. A method of claim 1, wherein the network connection is for accessing one or more services, and wherein the access is by group access, one or more individual access by at least one of the user devices, or a combination thereof.

6. A method of claim 5, further comprising:
    determining to cause at least in part a distribution of a user interface based, at least in part, on the group access, the one or more individual access, or a combination thereof.

7. A method of claim 1, wherein the determining to specify the group is based, at least in part, on one or more characteristics of the user devices, context information associated with the one or more user devices, or a combination thereof.

8. An apparatus comprising:
    at least one processor; and
    at least one memory including computer program code for one or more programs,
    the at least one memory and the computer program code configured to, with the at least one processor, cause the apparatus to perform at least the following,
        determine to specify at least one group of user devices, the at least one group of user devices including at least a first path to establish a network connection and a second path to establish a local connection among the user devices, wherein each user device of the group of user devices includes one or more user interfaces; and
        determine cause at least in part an activation of one or more user devices to establish the network connection,
    wherein one or more unactivated user devices share the network connection over the local connection,
    wherein two or more user devices of the at least one group of user devices are mobile terminals,
    wherein at least two of the two or more user devices of the at least one group of user devices are configured to establish a network connection and will be activated and accept the network connection responsibility to share the network connection over the local connection among the user devices of the at least one group of user devices,
    wherein the network connection comprises a cellular data service, and
    wherein an activated device of the at least one group user devices connects to the cellular data service and shares access to the cellular data service to unactivated user devices of the at least one group of user devices via the local connection
    wherein the apparatus is further caused to:
    determine a schedule for circulating an activation state among the user devices that are configured to establish a network connection for connection of the user devices that are configured to establish a network connection to the cellular data service, wherein the causing at least in part of the activation of the one or more user devices is based, at least in part, on the schedule.

9. An apparatus of claim 8, wherein the apparatus is further caused to:

determine one or more parameters including a number of the user devices, one or more characteristics of the first path, one or more characteristics of the network connection, one or more characteristics of the second path, one or more characteristics of the local connection, a turnover rate of the user devices, or a combination thereof, wherein the determining of the schedule is based, at least in part, on the one or more parameters.

10. An apparatus of claim 8, wherein the apparatus is further caused to:

determine a duration for the activation of the one or more user devices that are configured to establish a network connection to enable a substantially equal sharing of the activation state among the user devices that are configured to establish a network connection, wherein the schedule is based, at least in part, on the duration.

11. An apparatus of claim 8, wherein the apparatus is further caused to:

determine to cause at least in part a distribution of one or more computation closures associated with establishing the network connection among the user devices, wherein the causing at least in part of the activation of the one or more user devices comprises determining to cause at least in part an activation of the one or more computation closures.

12. An apparatus of claim 8, wherein the network connection is for accessing one or more services, and wherein the access is by group access, one or more individual access by at least one of the user devices, or a combination thereof.

13. An apparatus of claim 12, wherein the apparatus is further caused to:

determine to cause at least in part a distribution of a user interface based, at least in part, on the group access, the one or more individual access, or a combination thereof.

14. An apparatus of claim 8, wherein the determining to specify the group is based, at least in part, on one or more characteristics of the user devices, context information associated with the one or more user devices, or a combination thereof.

15. A non-transitory computer-readable storage medium carrying one or more sequences of one or more instructions which, when executed by one or more processors, cause an apparatus to at least perform at least the following steps:

determining to specify at least one group of user devices, the at least one group of user devices including at least a first path to establish a network connection and a second path to establish a local connection among the user devices, wherein each user device of the group of user devices includes one or more user interfaces; and determining to cause at least in part an activation of one or more user devices to establish the network connection, wherein one or more unactivated user devices share the network connection over the local connection, wherein two or more user devices of the at least one group of user devices are mobile terminals, wherein at least two of the two or more user devices of the at least one group of user devices are configured to establish a network connection and will be activated and accept the network connection responsibility to share the network connection over the local connection among the user devices of the at least one group of user devices, wherein the network connection comprises a cellular data service, and wherein an activated device of the at least one group of user devices connects to the cellular data service and shares access to the cellular data service to unactivated user devices of the at least one group of user devices via the local connection, wherein the apparatus is caused, at least in part, to further perform:

determining a schedule for circulating an activation state among the user devices that are configured to establish a network connection for connection of the user devices that are configured to establish a network connection to the cellular data service, wherein the causing at least in part of the activation of the one or more user devices is based, at least in part, on the schedule, and wherein the circulating of the activation state comprises passing a token among the user devices that are configured to establish a network connection, and wherein the token represents a responsibility for establishing the network connection.

\* \* \* \* \*